United States Patent
Wakasa

(10) Patent No.: US 8,896,540 B2
(45) Date of Patent: Nov. 25, 2014

(54) CHARACTER INPUT DEVICE AND CHARACTER INPUT METHOD

(75) Inventor: Tetsushi Wakasa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 136 days.

(21) Appl. No.: 13/634,363

(22) PCT Filed: Mar. 16, 2011

(86) PCT No.: PCT/JP2011/056298
§ 371 (c)(1),
(2), (4) Date: Sep. 12, 2012

(87) PCT Pub. No.: WO2011/115187
PCT Pub. Date: Sep. 22, 2011

(65) Prior Publication Data
US 2013/0002561 A1    Jan. 3, 2013

(30) Foreign Application Priority Data
Mar. 16, 2010  (JP) ................ 2010-059635

(51) Int. Cl.
G06F 3/02    (2006.01)
G09G 5/00    (2006.01)
G06F 3/041   (2006.01)
G06F 3/0488  (2013.01)
G06F 3/01    (2006.01)

(52) U.S. Cl.
CPC .. G06F 3/04886 (2013.01); *G06F 2203/04808* (2013.01); G06F 3/018 (2013.01)
USPC .......................... 345/168; 345/173; 345/170

(58) Field of Classification Search
CPC ... G06F 3/0202; G06F 3/0219; G06F 3/0213; G06F 3/023; G06F 3/0488; G06F 3/04883; G06F 3/044; G06F 3/04886; G06F 3/045
USPC ......................................... 345/168, 173, 170
See application file for complete search history.

(56) References Cited

U.S. PATENT DOCUMENTS

| | | | |
|---|---|---|---|
| 2005/0052406 A1* | 3/2005 | Stephanick et al. | 345/156 |
| 2006/0066590 A1 | 3/2006 | Ozawa et al. | |
| 2009/0225034 A1* | 9/2009 | Kida et al. | 345/171 |
| 2012/0149477 A1* | 6/2012 | Park et al. | 463/43 |

FOREIGN PATENT DOCUMENTS

| | | |
|---|---|---|
| JP | 07-013029 U1 | 3/1995 |
| JP | 2002-041245 A1 | 2/2002 |
| JP | 2003-177848 A1 | 6/2003 |
| JP | 2006-127488 A1 | 5/2006 |
| JP | 2007-026349 A1 | 2/2007 |

OTHER PUBLICATIONS

ISR for PCT/JP2011/056298 dated May 24, 2011.

* cited by examiner

*Primary Examiner* — Aneeta Yodichkas
(74) *Attorney, Agent, or Firm* — Lowe Hauptman & Ham, LLP

(57) ABSTRACT

According to an aspect, a character input device includes a display unit, an input detecting unit, and a control unit. The display unit displays a screen having a character entry area and a virtual keyboard. The virtual keyboard includes a plurality of keys each of which corresponds to a character. The input detecting unit detects a touch by an operator. The control unit detects a key selection operation and an input determination operation through the input detecting unit. Upon detecting the key selection operation for the first key, the control unit displays the first key in the character entry area as a character to be input. Upon detecting the input determination operation, the control unit displays the first character in the character entry area as an input character.

20 Claims, 11 Drawing Sheets

TOUCHED ORDER    1    2    3    4    5    6

CHARACTERS TO BE DISPLAYED

CHARACTER INPUT DEVICE AND CHARACTER INPUT METHOD

CROSS-REFERENCE TO RELATED APPLICATION

This application is a National Stage of PCT international application Ser. No. PCT/JP2011/056298 filed on Mar. 16, 2011 which designates the United States, and which is based upon and claims the benefit of priority from Japanese Patent Application No. 2010-059635, filed on Mar. 16, 2010.

FIELD

The present disclosure relates to a character input device and a character input method to perform character input.

BACKGROUND

For electronic devices such as mobile phones, there are various input devices to receive an instruction from an operator in a manner other than pressing down a keyboard, a numeric keypad, or a button. For example, Patent Literature 1 discloses a character input device configured to display a character input screen including a character display area on a display means and associate a touch panel with a virtual character table on which a plurality of characters are arranged. The character input device displays a character in the character display area as a character to be input, which corresponds to a position of a touch input on the touch panel in the virtual character table. While the touch input continues, the character input device disclosed in Patent Literature 1 changes a character to be input in accordance a changing position of the touch input and display the character in the character display area.

CITATION LIST

Patent Literature

Patent Literature 1: Japanese Patent Application Laid-Open No. 2007-26349

Technical Problem

Some mobile electronic devices include a so-called virtual keyboard as an input unit. The virtual keyboard is displayed as an image of a common QWERTY keyboard on an image display unit. Character input is established by touching an image of a desired key through the touch panel on a front face of the display unit.

However, the virtual key does not provide a concavity and convexity and a clicking feel, which are provided by hardware keys. Accordingly, in order to input a desired character, the operator needs to input a character while checking which position on the keyboard (virtual key) is touched. Consequently, a problem arises in that it is difficult to input characters by so-called touch-typing where the operator inputs characters while mainly looking at the character entry area.

For the foregoing reasons, there is a need for a character input device and a character input method that facilitates input operation by the touch-typing when using a virtual keyboard.

SUMMARY

According to an aspect, a character input device includes a display unit for displaying an image, an input detecting unit, which overlaps the display unit, for detecting a touch input by an operator, the input detecting unit overlapping the display unit, and a control unit for displaying a virtual keyboard on the display unit. Upon detecting that a key image in the virtual keyboard is touched through the input detecting unit, the control unit displays a character corresponding to the key being touched in a character entry area of the display unit as a character to be input. Upon detecting an operation of determining the character to be input through the input detecting unit, the control unit displays the character to be input in the character entry area of the display unit as an input character constituting an input string.

According to another aspect, the control unit is configured to delete, when the touch is released without a determining operation during the touch, the character to be input corresponding to the key being touched in the character entry area.

According to another aspect, the control unit is configured to set a color of the key being touched and a background color of the character to be input to a same color.

According to another aspect, the control unit is configured to change a background color of the character to be input to another color when the operation of determining the character to be input is detected through the input detecting unit.

According to another aspect, the control unit is configured to set, upon detecting that a plurality of keys are touched through the input detecting unit, respective colors of the plurality of keys being touched and respective background colors of a plurality of characters to be input corresponding thereto to different colors according to a touched order.

According to another aspect, the control unit is configured to set the background colors of the plurality of keys being touched and the background colors of the plurality of characters to be input corresponding thereto to colors that have a same color phase and are gradually brighter or darker according to the touched order.

According to another aspect, the control unit is configured to convert, when the character to be input is an alphabet and the character to be input is allowed to be converted to a Kana character by inputting the character to be input after another input alphabet, the character to be input or a combination of the character to be input with an input alphabet immediately before the character to be input to the Kana character to display at position thereof.

According to another aspect, the control unit is configured to set the background color of the replaced Kana character to a same color as the background color of the character to be input before replacing.

According to another aspect, the control unit is configured to display the virtual keyboard, in which colors of the respective keys are preliminarily set, on the display unit.

According to another aspect, the control unit is configured to display, upon detecting that the key image in the virtual keyboard is touched through the input detecting unit, the character corresponding to the key in the character entry area of the display unit as the character to be input, and set a background color of the character to be input to a same color as the color of the key.

According to another aspect, the control unit is configured to display the virtual keyboard on the display unit, the virtual keyboard including the keys at one side of a horizontal center having a first color phase and the keys at another side of the horizontal center having a second color phase, the keys gradually changing in brightness that are brighter or darker toward both ends from the horizontal center.

According to another aspect, the input detecting unit is configured to detect a touch in at least two stages including a touch with pressure equal to or less than a predetermined threshold value and a touch with pressure higher than the threshold value, and the control unit is configured to determine, upon detecting that the image of the key is touched with a pressure higher than the threshold value through the input detecting unit, an input of the character corresponding to the key.

According to another aspect, the control unit is configured to determine, upon detecting that the touch to the image of the key is released through the input detecting unit, an input of the character corresponding to the key.

According to another aspect, a character input method is for a character input device that includes a display unit for displaying an image and an input detecting unit for detecting a touch input by an operator, the input detecting unit overlapping the display unit. The method includes: displaying a virtual keyboard on the display unit; displaying, upon detecting that a key image in the virtual keyboard is touched through the input detecting unit, a character corresponding to the key being touched in a character entry area of the display unit as a character to be input; and displaying, upon detecting an operation of determining the character to be input through the input detecting unit, the character to be input in the character entry area of the display unit as an input character constituting an input string.

Advantageous Effects of Invention

The character input device and the character input method according to the present invention facilitates character input by the touch-typing as advantageous effects.

DESCRIPTION OF EMBODIMENTS

A description will be given of embodiments of the present invention in detail below with reference to the accompanying drawings. The following description does not limit the present invention. The constituent elements described below include various modifications that will readily occur to those skilled in the art, modifications substantially identical thereto, or what is called equivalent range thereof. The following description employs a mobile communication device, more specifically, a mobile phone as an exemplary character input device. However, an object to which the present invention is applied is not limited to the mobile phones. For example, the present invention is applicable to PHSs (Personal Handyphone System), PDAs, portable navigation devices, car navigation devices, laptop personal computers, gaming devices, vending machines, ATMs (Automated Teller Machine), and the like.

Figure 1:
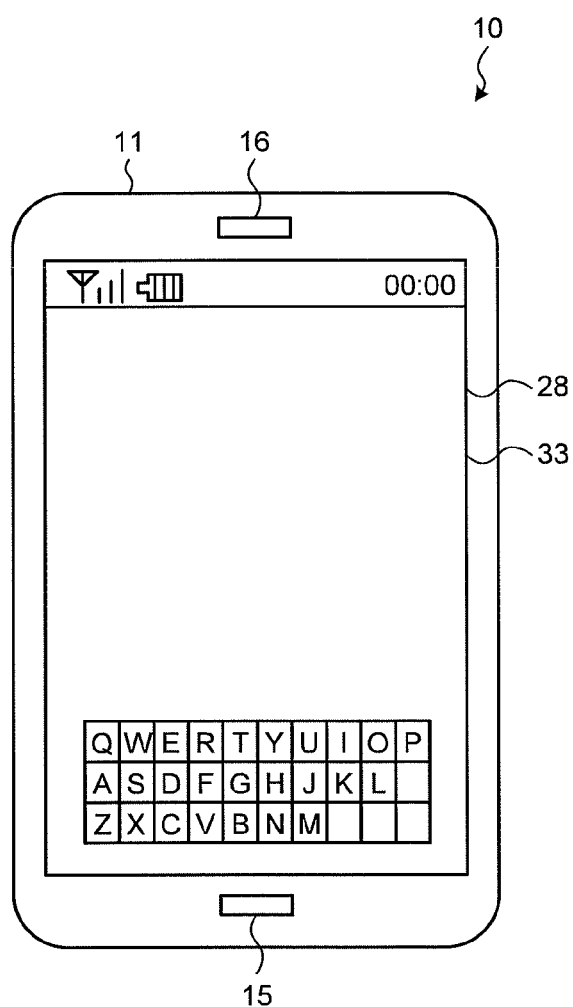
FIG. 1 is a view illustrating an appearance of a mobile communication device.

First of all, a description will be given of an appearance of a mobile communication device 10 with reference to FIG. 1. FIG. 1 is a view illustrating the appearance of the mobile communication device 10. As illustrated in FIG. 1, the mobile communication device 10 includes a housing 11 that contains respective units that constitute the mobile communication device 10. The housing 11 has a display unit 33 disposed on a front face thereof. The display unit 33 has an input unit 28 disposed on a front face thereof. A microphone 15 is arranged at one end in the longer side direction on the front face of the housing 11 (a face on which the display unit 33 is disposed). A receiver 16 is arranged at another end in the longer side direction on the front face of the housing 11. The mobile communication device 10 in FIG. 1 displays a character input screen, which will be described below, on the display unit 33. A virtual keyboard with a QWERTY layout is displayed on the character input screen.

Figure 2:
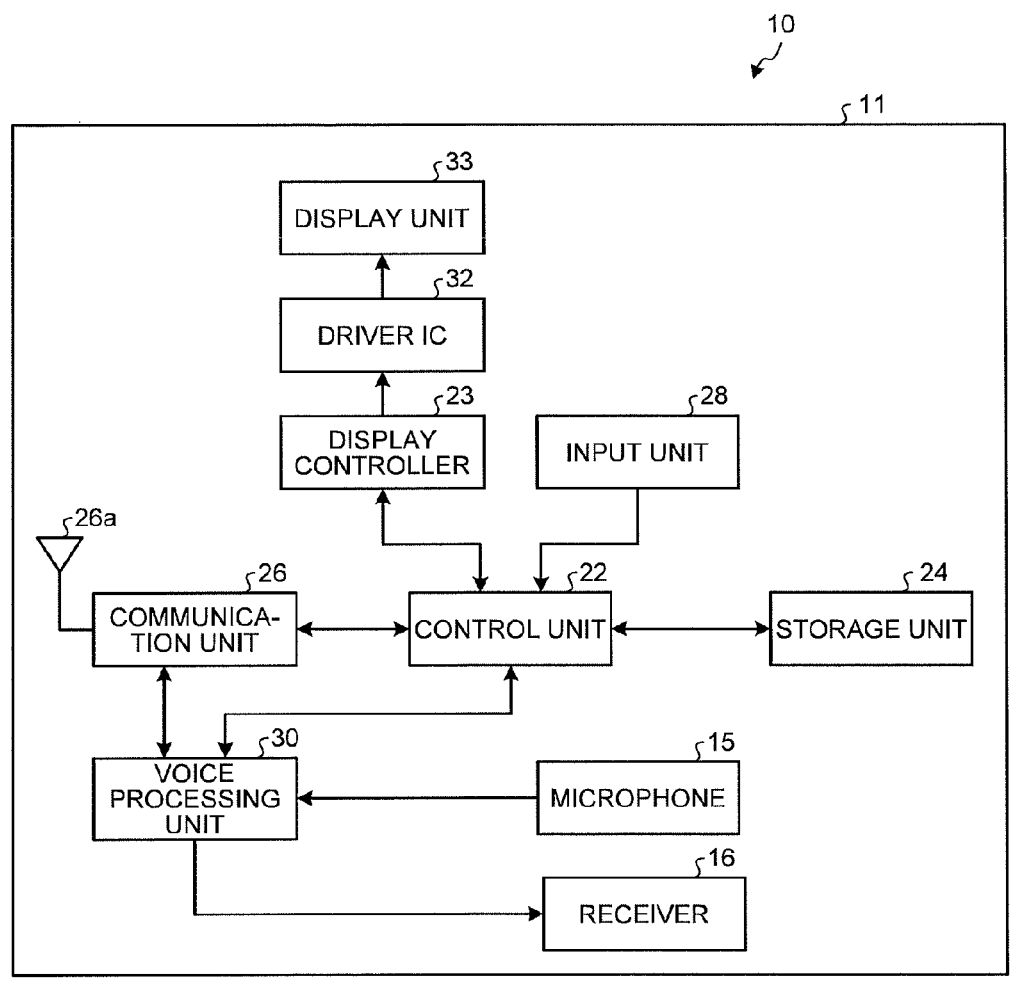
FIG. 2 is a block diagram illustrating a schematic functional configuration of an embodiment of the mobile communication device.

Then, a description will be given of a schematic functional configuration of the mobile communication device 10. FIG. 2 is a block diagram illustrating a schematic functional configuration of an embodiment of the mobile communication device. The mobile communication device 10 is a mobile phone that includes a wireless communication function. As illustrated in FIG. 2, the mobile communication device 10 includes a control unit 22, a display controller 23, a storage unit 24, a communication unit 26, an input unit 28, a voice processing unit 30, a driver IC 32, and a display unit 33.

The control unit 22 is a processing unit such as a CPU (Central Processing Unit) that integrally controls the whole operation of the mobile communication device 10. That is, the control unit 22 controls operations of the communication unit 26, the display unit 33, and the like. Thus, various processings of the mobile communication device 10 are executed in an appropriate procedure in accordance with input from the input unit 28 and software stored in the storage unit 24 of the mobile communication device 10. The control unit 22 executes the processings based on programs (for example, an operating system program and an application program) stored in the storage unit 24. The control unit 22 is able to execute a plurality of programs (an application program, software) in parallel. The control unit 22 activates a program of the character input application, which is stored in the storage unit 24, thus displaying the virtual keyboard on the display unit 33. The control unit 22 executes a character input processing in response to a detection of input (touch) through the input unit 28. The character input processing will be described later.

The display controller 23 generates an image based on various conditions and image information (image data) that are transmitted from the control unit 22. Then, the display controller 23 outputs the generated image to the driver IC 32. While in this embodiment, the display controller 23 is provided as a controller different from the control unit 22, the present invention is not limited to this configuration. The display controller 23 may be integrated with the control unit 22, or may be provided as a part of the control unit 22.

The storage unit 24 stores application programs and data that are processed by the control unit 22. Specifically, the storage unit 24 stores the program of the character input application, etc. In addition, the storage unit 24 also stores data including dictionary data for character conversion, address book data, coordinates and key correspondence database, etc. The coordinates and key correspondence database associates coordinates of the input unit 28 with a virtual key.

The communication unit 26 includes an antenna 26a. The communication unit 26 uses a CDMA system or the like so as to establish a wireless signal path between the communication unit 26 and a base station through a channel assigned by the base station. Then, the communication unit 26 performs telephone communication and information communication with the base station.

The input unit 28 is a touch panel overlapping the front face of the display unit 33. In the case where an operator touches a surface of the input unit 28, the input unit 28 detects a resultant contact as input. Specifically, the input unit 28 detects a position of the contact, the strength of the contact, and the like. Various types of touch panel can be employed as the touch panel, for example, matrix switch type touch panel, a resistive type touch panel, a surface acoustic wave type touch panel, an infrared type touch panel, an electromagnetic type touch panel, and a capacitive type touch panel, and the like. In the case where the operator pushes the input unit 28 while images of keys to which various functions of a power key, a talk key, a numeric key, a character key, a navigation key, a selection key, a call key, and the like are assigned are displayed on the display unit 33, the input unit 28 detects the pushed position (the contact position). The control unit 22 of the mobile communication device 10 determines that an operation for a key corresponding to the contact position detected by the input unit 28 is input, and thus executes a corresponding process.

The voice processing unit 30 executes processing of a voice signal received at the microphone 15 and processing of a voice signal output from the receiver 16.

The driver IC 32 generates video that corresponds to video data and a signal that corresponds to image data that are provided from the display controller 23, and then outputs them to the display unit 33. The display unit 33 includes a display panel constituted of an LCD (Liquid Crystal Display), an OEL (Organic Electro-Luminescence) panel, or the like. The display unit 33 displays an image based on the signal transmitted from the driver IC 32.

Then, a description will be given of an image displayed on a screen when the character is input with reference to FIGS. 3A to 5D. FIGS. 3A to 5D are explanatory views illustrating exemplary images displayed on the display unit 33, and illustrate situations where the operator is inputting a character string of "KONNICHIWA. ITSUMO ARIGATO". In the following example, the mobile communication device 10 activates the character input application, which displays the character input screen on the display unit 33. A key selection operation and an input determination operation are configured in the mobile communication device 10. In the case where the input unit 28 is simply touched (the key selection operation is input), the mobile communication device 10 does not determine that the key is input but determines that the key is selected.

Figure 3A:
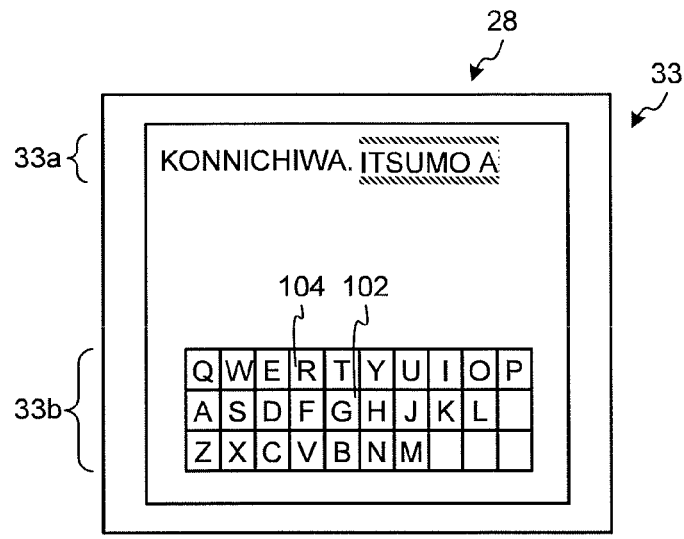
FIG. 3A is an explanatory view illustrating an operation of the mobile communication device.

First of all, a description will be given of an example where the operator uses one finger. The mobile communication device 10 displays a character entry area 33a on the upper side of the display unit 33 in the drawing as illustrated in FIG. 3A. The mobile communication device 10 displays a virtual keyboard 33b with a QWERTY layout on the lower side of the display unit 33 in the drawing. The character entry area 33a displays a character string input by the operation of the operator and a character string being input by the operation of the operator. Specifically, the character entry area 33a displays a character string that has been finally determined, a character string that has been input and has not been finally determined (unconverted), and a character string of character to be input (that has been selected and has not been determined as input). In the character entry area 33a illustrated in FIG. 3A, a character string of "KONNICHIWA." has been finally determined and is displayed therein. Further, a character string of "ITSUMO A" is displayed after the character string of "KONNICHIWA." in a state where it has been input and has not been finally determined. Since the character string of "KONNICHIWA." has been finally determined, the character string of "KONNICHIWA." has a background color indicative of a character string that has been finally determined, for example, a white. On the other hand, since the character string of "ITSUMO A" has been input and has not been finally determined, the character string of "ITSUMO A" has a background color indicative of a character string that has been input and has not been finally determined, for example, a blue.

Figure 3B:
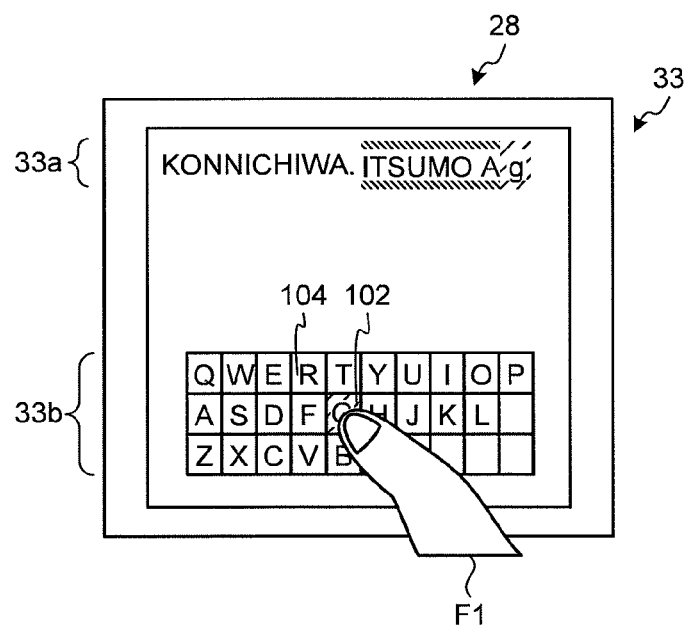
FIG. 3B is an explanatory view illustrating an operation of the mobile communication device.

As illustrated in FIG. 3B, in the case where the operator's finger F1 touches a virtual key 102 of "G" (that is, a touch is detected), the mobile communication device 10 in FIG. 3A displays a character of "g" after the character string of "ITSUMO A" in the character entry area 33a as a character to be input. Further, the mobile communication device 10 sets a background color of the virtual key 102 of "G" and a background color of a character of "g" in the character entry area 33a to the same color of, for example, a pink.

Figure 3C:
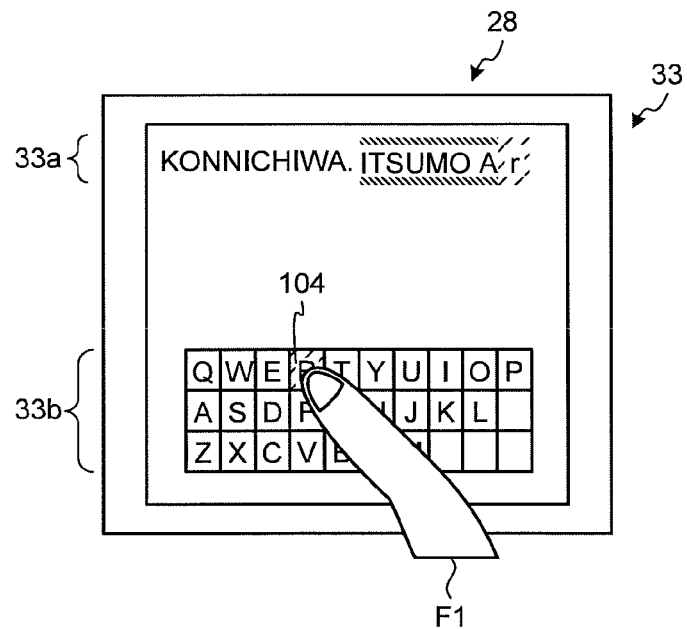
FIG. 3C is an explanatory view illustrating an operation of the mobile communication device.

As illustrated in FIG. 3C, in the case where the position touched by the operator's finger F1 is moved from the virtual key 102 of "G" to a virtual key 104 of "R" without losing a contact, the mobile communication device 10 in FIG. 3B displays a character of "r" instead of the character of "g" at the end of the character string in the character entry area 33a as a character to be input. Further, the mobile communication device 10 sets a background color of the virtual key 104 of "R" and a background color of the character of "r" in the character entry area 33a to the same color of, for example, a pink. The mobile communication device 10 also sets the background color of the virtual key 102 of "G" to an original color (a color other than pink)

Figure 3D:
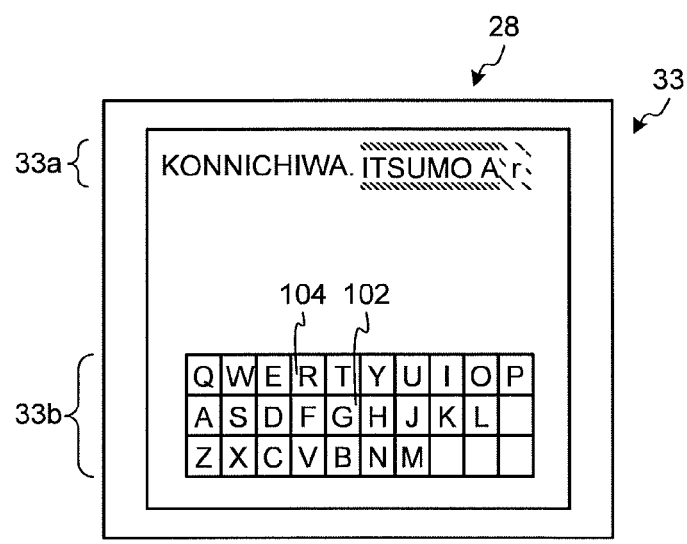
FIG. 3D is an explanatory view illustrating an operation of the mobile communication device.

Subsequently, the operator inputs an input determining operation for the character of "r". Then, as illustrated in FIG. 3D, the mobile communication device 10 changes the background color of the character of "r" in the character entry area 33a to a color indicative of a character string that has been input and has not been converted to Hiragana, for example, a light blue.

Various settings can be employed as a setting of a selecting operation and a determining operation with respect to character input. For example, the input unit 28 may be configured to detect a touch thereto in two stages: a touch with pressure equal to or less than a threshold value, and a touch with pressure higher than the threshold value. In this case, upon detecting that a key image is touched with pressure lower than the threshold value, the mobile communication device 10 determines that a character corresponding to the virtual key displayed in the coordinates is selected. Upon detecting that a key image was touched with pressure higher than the threshold value, the mobile communication device 10 determines that a character corresponding to the key displayed in the coordinates is input (the input is determined). In this way, a setting can be employed in which an operation is determined based on the pressure of the touch (contact), thus allowing the user to determine input selection only by pressing the input unit 28 with higher pressure. In the above embodiment, the pressure on the input unit 28 is determined in two stages and the respective pressures are assigned to the selecting operation and the determining operation; however, the pressure may be detected in three or more stages by setting two or more threshold values with respect to the pressure. In this case, in addition to the selecting operation and the determining operation, various control on the character input, such as an instruction to initiate conversion and an instruction of segmentation, can be assigned to the stages of pressure. Alternatively, for example, upon detecting that the operator has released the touch, the mobile communication device 10 may determine that the determining operation finalizes is input and thus a character corresponding to the key displayed in the coordinates is input.

As described above, upon detecting a touch on a virtual key, the mobile communication device 10 displays a character corresponding to the touched virtual key in the character entry area 33a as a character to be input. Upon detecting an operation to determine the character to be input, the mobile communication device 10 displays the character to be input in the character entry area 33a as a determined input character. This allows the user to easily perform touch-typing the user performs the character input while mainly looking at the character entry area 33a. In other words, this allows the user to judge which key is touched without checking the virtual keyboard, thus facilitating the touch-typing. Moreover, the mobile communication device 10 sets the background color of the touched virtual key and the background color of the character to be input in the character entry area 33a to the same color, which further facilitates touch-typing. Furthermore, in the case where the user moves his/her finger freely on the keyboard while keeping touching, the mobile communication device 10 displays a character corresponding to the touched key in the character entry area as a character to be input while sequentially changing a character to be displayed. This allows the user to know which key is being touched by looking at the character entry area 33a without looking at the keyboard. Thus, touch-typing can be established.

Figure 4A:
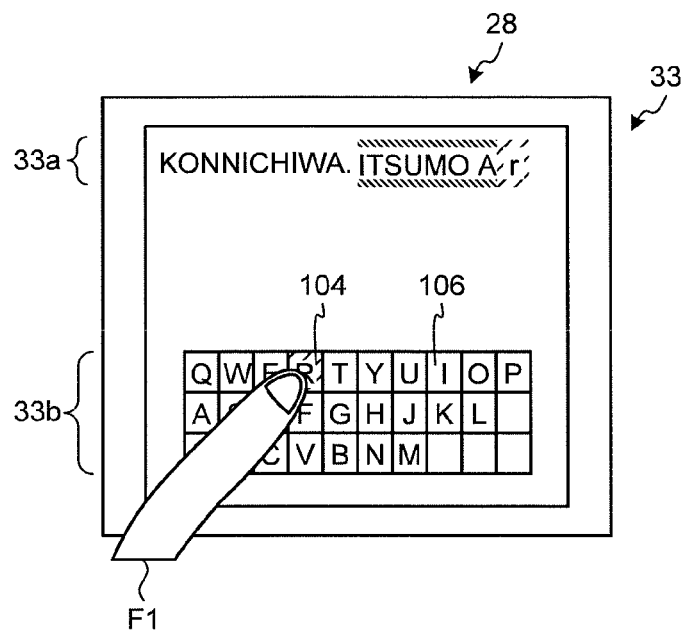
FIG. 4A is an explanatory view illustrating an operation of the mobile communication device.

Then, a description will be given of a first example where an operator uses two fingers. First of all, in the case where the operator's first finger F1 touches the virtual key 104 of "R", the mobile communication device 10, which displays the screen illustrated in FIG. 3A, displays a character of "r" as the character to be input after a character string of "ITSUMO A" in the character entry area 33a as illustrated in FIG. 4A. The mobile communication device 10 sets the background color of the virtual key 104 of "R" and the background color of the character of "r" in the character entry area 33a to the same color of, for example, a pink.

Figure 4B:
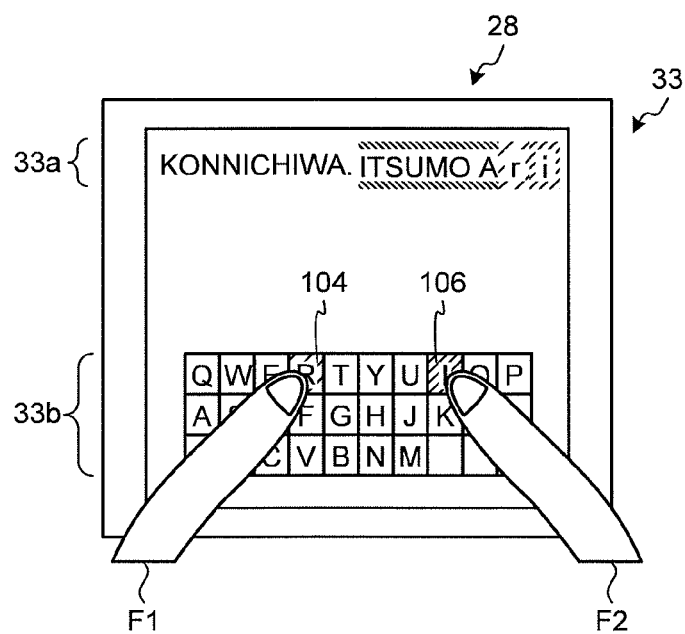
FIG. 4B is an explanatory view illustrating an operation of the mobile communication device.

Subsequently, in the case where a second finger F2 touches a virtual key 106 of "I" while the operator's first finger F1 keeps touching the virtual key 104 of "R" as illustrated in FIG. 4B, the mobile communication device 10 displays a character of "i" after the character string of "ITSUMO Ar" in the character entry area 33a. At this time, the mobile communication device 10 sets the background color of the virtual key 106 of "I" and the background color of the character of "i" in the character entry area 33a to a color that has the same phase as those of the background color of the virtual key 104 of "R" and the background color of the character of "r" in the character entry area 33a, and has a brightness brighter or darker than those. The color is set to, for example, a deep pink.

Figure 4C:
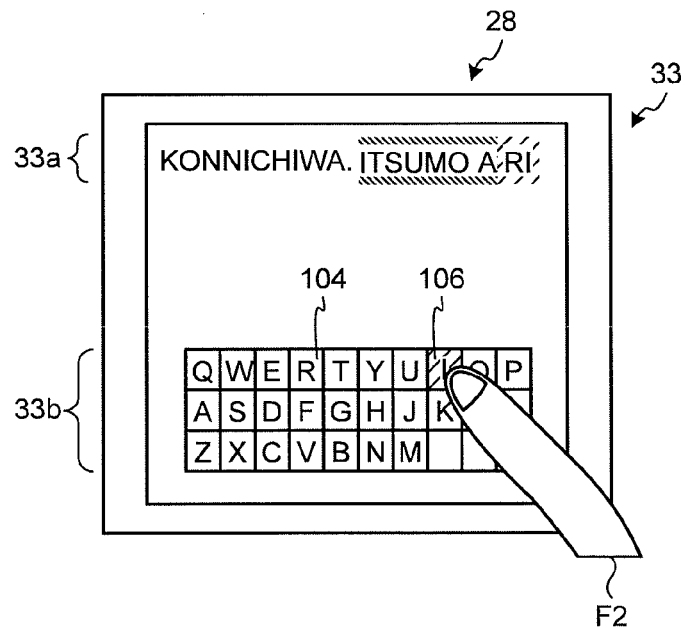
FIG. 4C is an explanatory view illustrating an operation of the mobile communication device.

Thereafter, in the case where the operator determines the character of "r" as input (that is, the determining operation is detected), the mobile communication device 10 displays the character "RI" after the character string of "ITSUMO A" in the character entry area 33a as illustrated in FIG. 4C. Hiragana character of "RI" is a character converted from a combination of the determined input character of "r" and the character to be input of "i" corresponding to the virtual key 106 of "I", which is touched by the second finger F2. In this conversion, the romanization of Japanese is converted to Hiragana character (input alphabet(s) are converted to Japanese Hiragana using a predetermined rule). That is, in the case where a character to be input is capable of being combined with a determined input character immediately before the character to be input so as to convert them to a Hiragana character, the mobile communication device 10 displays the Hiragana character in the character entry area 33a.

Figure 4D:
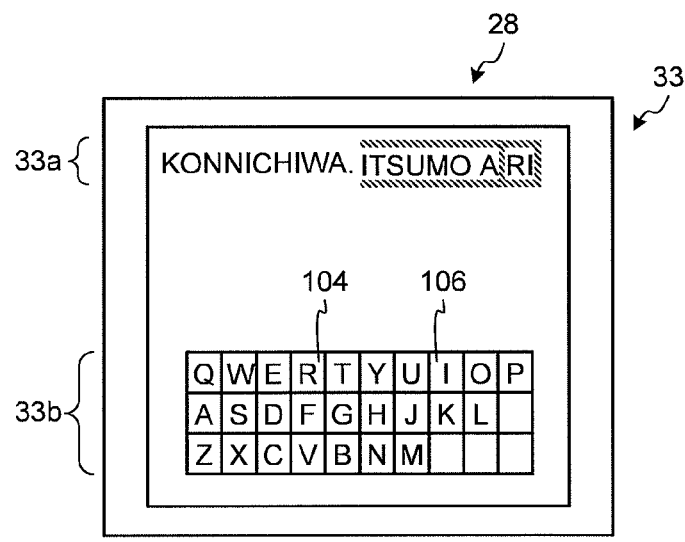
FIG. 4D is an explanatory view illustrating an operation of the mobile communication device.

Thereafter, in the case where the operator determines the character of "i" as input, the mobile communication device 10 changes the background color of the Hiragana character of "RI" in the character entry area 33a to a color indicative of a character string that has been input, for example, a light blue, as illustrated in FIG. 4D.

As described above, in the case where a multiple virtual keys are touched, the mobile communication device 10 sets background colors of the pressed keys and background colors of respective character to be input to colors that has the same color phase, and are gradually brighter or darker according to their touched order. This facilitates touch-typing.

Moreover, in the case where the character to be input is capable of being combined with the determined input character immediately before the character to be input so as to convert them to a Hiragana character as illustrated in FIG. 4C, the Hiragana character is displayed. This allows the user to recognize more accurately whether the desired input character has been input. For example, in the case where the operator moves the position of touch onto a virtual key image of "U" while keeping touching without determining the character of "i" as input in the scene illustrated in FIG. 4C, the character to be input is changed to "u". Accordingly, the mobile communication device 10 displays a character of "RU" in the character entry area 33a. "RU" is a character converted from a combination of the determined input character of "r" and the character to be input of "u" through the conversion between romanization of Japanese and Hiragana. This also allows input of an appropriate character in the case where the romanization of Japanese is input. In the case where a finger is touching a key, and is moved onto another key, moving onto a key corresponding to a character combinable with a preceding alphabet displays a Hiragana character, and moving onto a key character that is not combinable with a preceding alphabet displays a combination of the character with the alphabet. In the above embodiment, the character to be input is combined with the determined input character immediately before one character; however, a plurality of determined input characters may be used. For example in the case where "CH" are determined input characters and "e" is a character to be input, a character of "CHE" may be displayed in the character entry area 33a. In the case where the character to be input is able to be converted to a Hiragana character alone, for example, in the case where the character to be input is one of the following characters of "A", "I", "U", "E", and "O", the character to be input may be converted to a Hiragana character alone.

Similarly to the character display method described in FIGS. 3A to 3D, the mobile communication device 10 may display different background colors between a character that has been input and has been converted to Hiragana and a character that has been input and has not been converted to Hiragana. That is, the determined input character (character after the determination processing and before final determination) may have different background colors depending on whether it is displayed as the romanization of Japanese or Hiragana. This allows the user to easily judge whether or not the preceding determined input character is capable of being combined with the character to be input for converting Hiragana characters.

The mobile communication device 10 may display an expected string by predictive conversion on the display unit 33 in FIG. 4D. The character entry area 33a in FIG. 4D displays a character string, which has been input, of "ITSUMO ARI". Accordingly, the mobile communication device 10 may display the expected string of, for example, "ITSUMO ARIGATO" or "ITUMO ARIGATAI" by predictive conversion adjacent to the character entry area 33a, thus allowing the operator to select this displayed character string by touching. In the above embodiment, the case of a Japanese input is described; however, the embodiment is applicable to an English input. At this time, for example, in the case where a character string of "Thank" is input, the mobile communication device 10 may display an expected string of "Thank you" or "Thanks" by predictive conversion adjacent to the character entry area 33a, thus allowing the operator to select this displayed character string by touching. Thus, load on the character input is reduced.

Figure 5A:
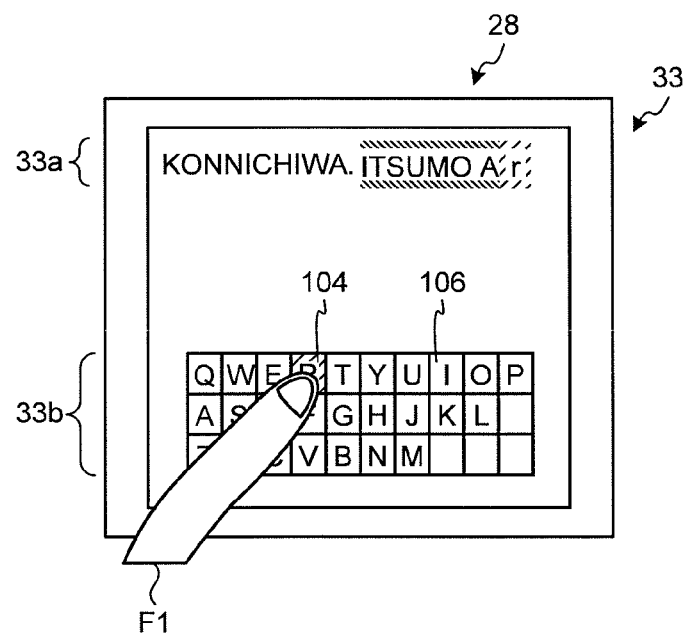
FIG. 5A is an explanatory view illustrating an operation of the mobile communication device.

Then, a description will be given of a second example where an operator uses two fingers for input. First of all, in the case where the operator's first finger F1 touches the virtual key 104 of "R", the mobile communication device 10, which displays the screen in FIG. 3A, displays a character of "r" after a character string of "ITSUMO A" as a character to be input in the character entry area 33a as illustrated in FIG. 5A. The background color is similar to FIG. 4A.

Figure 5B:
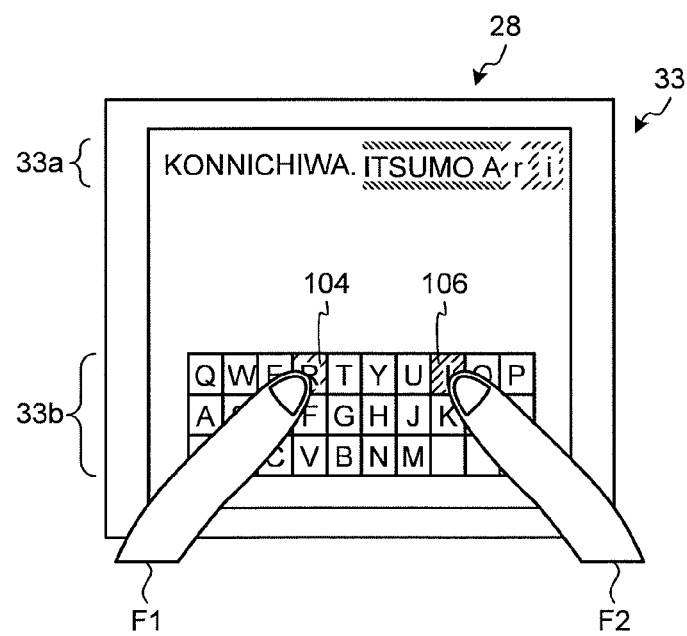
FIG. 5B is an explanatory view illustrating an operation of the mobile communication device.

Subsequently, as illustrated in FIG. 5B, in the case where the second finger F2 touches the virtual key 106 of "I" while the operator's first finger F1 touches the virtual key 104 of "R", the mobile communication device 10 displays a character of "i" after the character string of "ITSUMO Ar" in the character entry area 33a. The background color is similar to that in FIG. 4B.

Figure 5C:
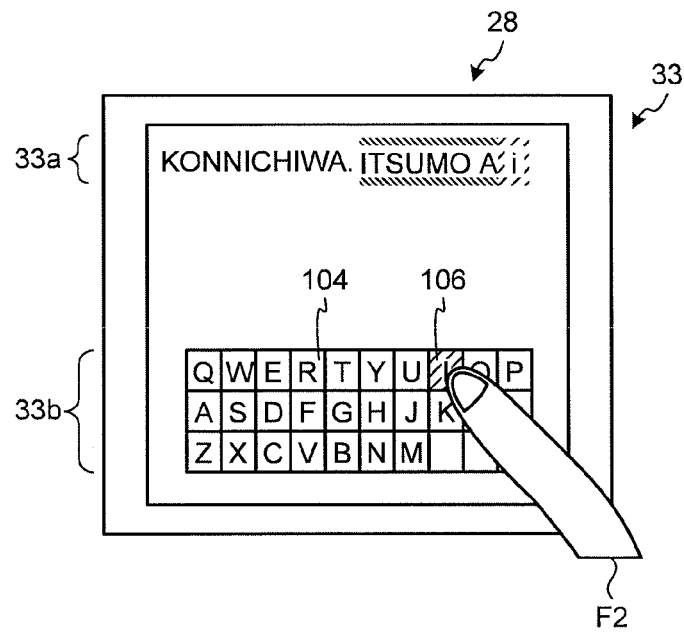
FIG. 5C is an explanatory view illustrating an operation of the mobile communication device.

Thereafter, in the case where the operator release the touch on the virtual key 104 of "R" without determining the character input of "r", the mobile communication device 10 deletes the character of "r" in the character entry area 33a as illustrated in FIG. 5C. That is, the mobile communication device 10 displays the character string of "ITSUMO Ai" in the character entry area 33a as a character string that has not been finally determined. At this time, the mobile communication device 10 may display the Hiragana character of "I" that is replaced from the character to be input of "i" at the end of the character string in the character entry area 33a.

Figure 5D:
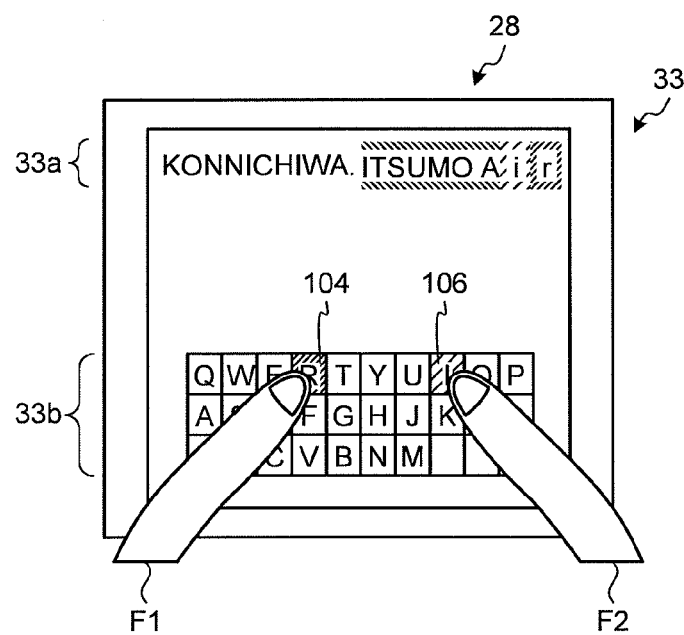
FIG. 5D is an explanatory view illustrating an operation of the mobile communication device.

Subsequently, in the case where the operator's first finger F1 touches the virtual key 104 of "R", the mobile communication device 10 displays a character of "r" after the character string of "ITSUMO Ai" in the character entry area 33a as illustrated in FIG. 5D. At this time, the mobile communication device 10 sets the background color of the virtual key 104 of "R" and the background color of the character of "r" in the character entry area 33a to a color that has the same color phase as those of the background color of the virtual key 106 of "I" and the background color of the character of "i" in the character entry area 33a, and has a brightness brighter or darker than those. The color is set to, for example, a deep pink.

Thus, the mobile communication device 10 eliminates the character of which the selecting operation is terminated without determining the input. This allows the user to easily change the order of the character input.

Figure 6:
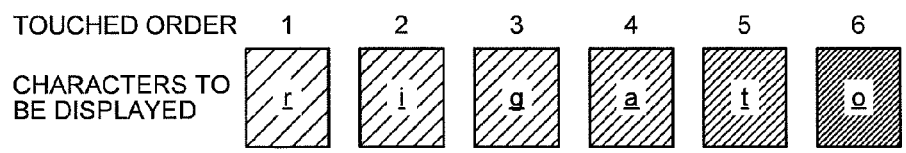
FIG. 6 is an explanatory view illustrating an operation of the mobile communication device.

In FIGS. 4A to 5D, a description is given of the example where the operator uses two fingers; however, the operator may also use three fingers or more to input characters. In this case, the mobile communication device 10 may set background colors of a plurality of touched virtual keys and background colors of a plurality of characters corresponding to touched virtual keys to colors according to their touched order. FIG. 6 is an explanatory view illustrating an exemplary character string of "rigato" that is displayed in the character entry area 33a in the case where the operator touches virtual keys in an order of "R", "I", "G", "A", "T", and "O". As illustrated in FIG. 6, the mobile communication device 10 may set the background colors of the character to be input to, for example, colors that have the same color phase and are gradually brighter or darker according to the order they were touched. At this time, the mobile communication device 10 sets the respective background colors of touched virtual keys to the same color as the respective background colors of the character to be input, which facilitates touch-typing.

Figure 7:
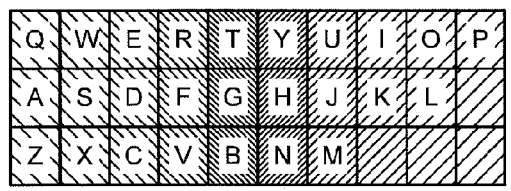
FIG. 7 is an explanatory view illustrating an operation of the mobile communication device.

In the above example, the background color of the touched virtual key is changed when the virtual key is touched; however, the respective background colors of the virtual keys may be preliminarily set. FIG. 7 is an explanatory diagram illustrating an exemplary virtual keyboard where the respective background colors of the virtual keys are preliminarily set. In the virtual keyboard of FIG. 7, background colors of virtual keys in the first group each have a green color phase. The virtual keys in the first group are arranged at the right side with respect to the horizontal center. The right side is assumed to be mainly touched by the operator's right hand finger. The background colors of the virtual keys in the first group have brightness that are brighter toward the right edge in the drawing. Background colors of virtual keys in the second group each have a pink color phase. The virtual keys in the second group are arranged at the left side with respect to the horizontal center. The left side is assumed to be mainly touched by the operator's left hand finger. The background colors of the virtual keys in the second group have brightness that are brighter toward the left edge in the drawing.

In the case where the virtual keyboard in FIG. 7 is used, when a virtual key is touched, the mobile communication device 10 sets the background color of the character corresponding to the touched virtual key to the same color as the background color of the touched virtual keys without changing the color of the touched virtual key. Moreover, when the determining operation is input for the character to be input (that is, the character has been input), the mobile communication device 10 changes, similarly to the above embodiment, the background color of the determined input character to, for example, a light blue. That is, the character to be input and the determined input character have different back colors.

Thus, the mobile communication device 10 sets the background color of the character to be input in the character entry area 33a to the same color as the background color of the virtual key image that is touched. This consequently facilitates touch-typing. That is, this allows the operator to judge more easily which position of the virtual keys is touched by color, thus ensuring the judge of the touched position on the virtual keys.

In FIG. 7, the background colors of the keys have brightness that is gradually brighter toward the horizontal end from the horizontal center; however, the brightness may be gradually darker.

Figure 8:
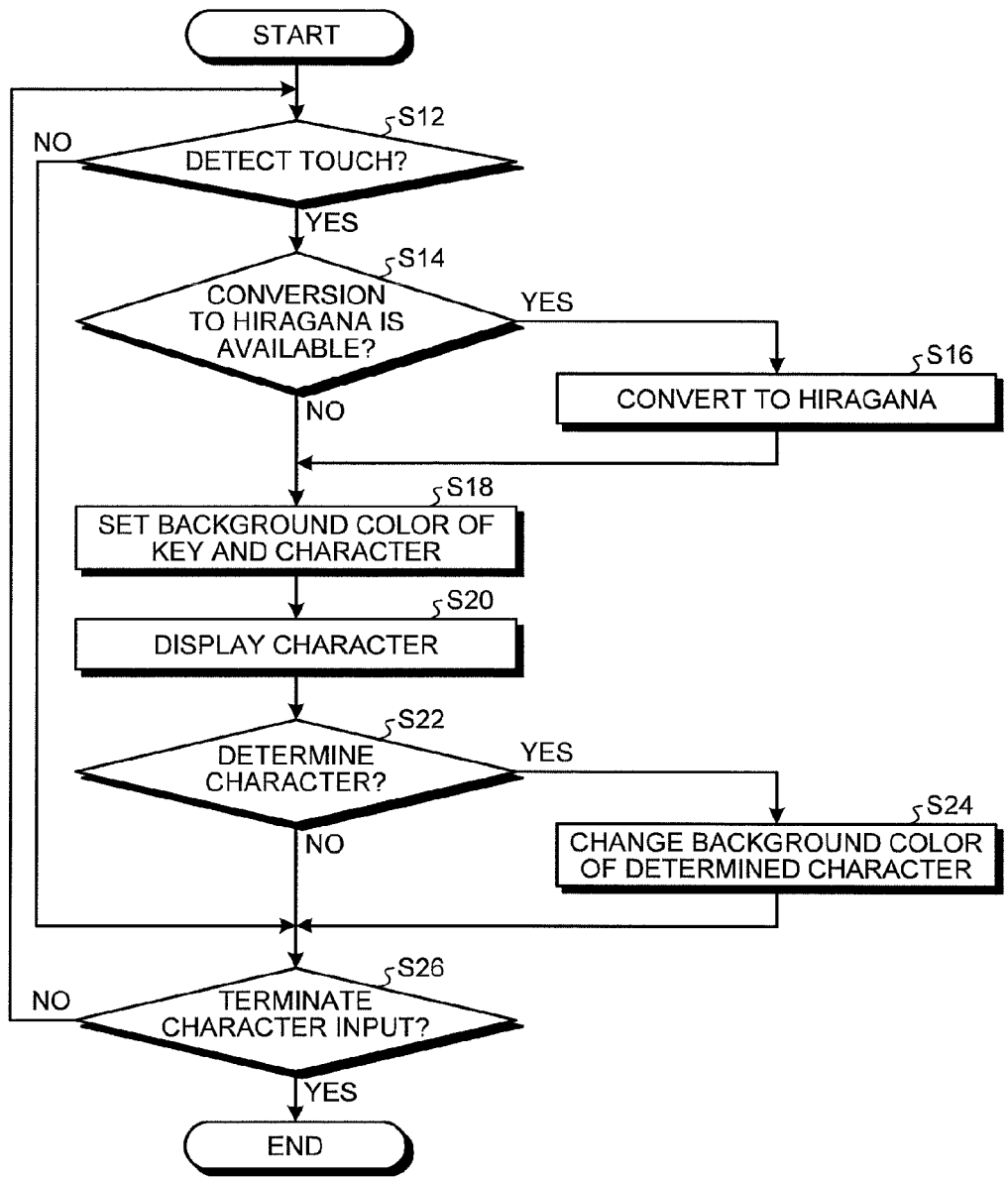
FIG. 8 is a flowchart illustrating a processing operation of the mobile communication device.
Figure 9:
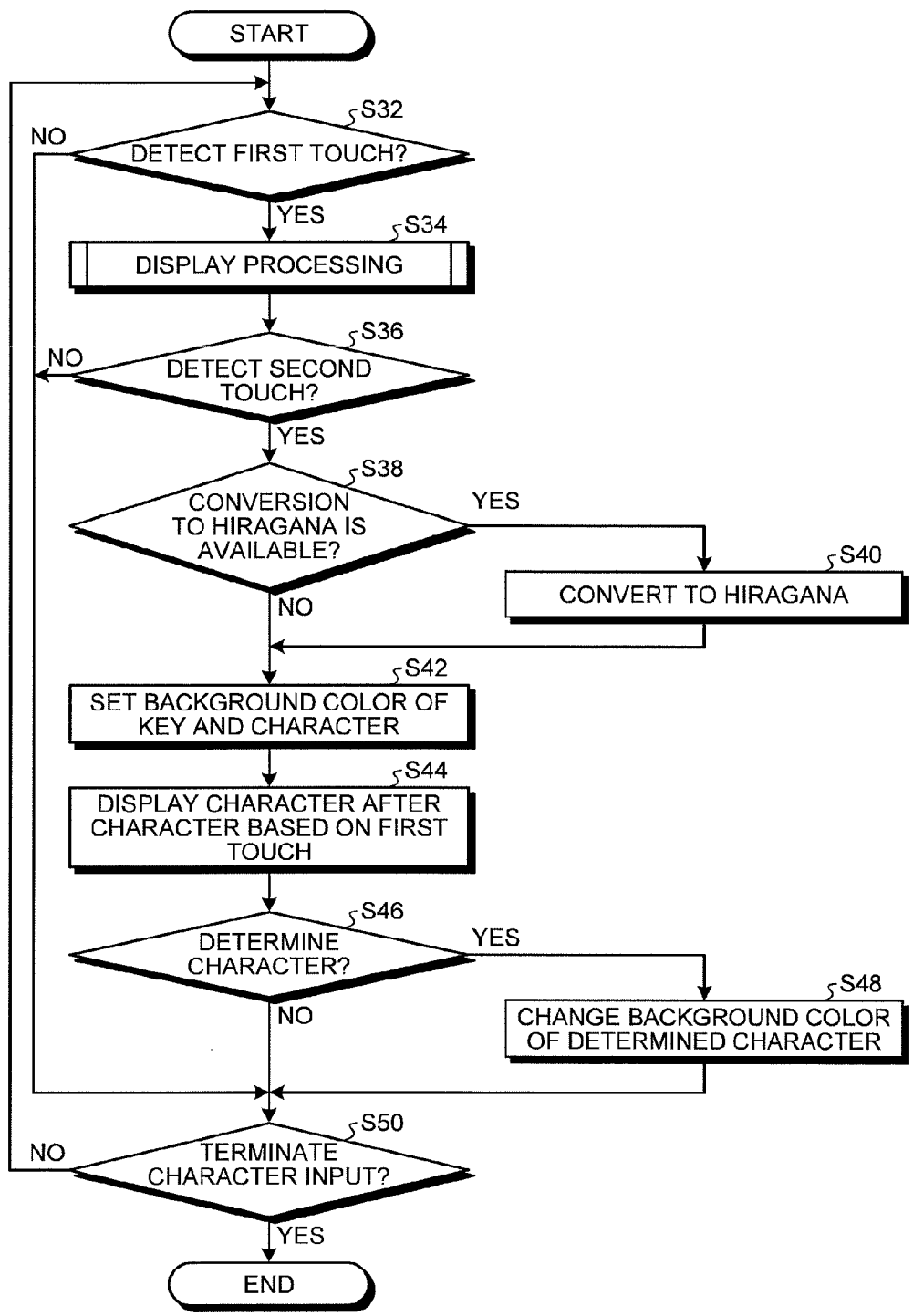
FIG. 9 is a flowchart illustrating a processing operation of the mobile communication device.

Then, a description will be given of operations of the mobile communication device 10, specifically, a character input receiving operation with reference to FIGS. 8 and 9. FIG. 8 is a flowchart illustrating an exemplary operation of the mobile communication device in the case where an operator uses one finger to input characters. FIG. 9 is a flowchart illustrating an exemplary operation of the mobile communication device in the case where an operator uses two fingers to input characters. A description of FIGS. 8 and 9 will be given of a case where background colors of virtual keys are changed according to their touched order. In a case where the virtual keyboard (see FIG. 7) in which the background colors are preliminarily set to the respective virtual keys is used, a similar processing is executed except that, upon determining the background color, the background color of the character to be input or a Hiragana character is set to the same color as the background color of the touched virtual key without changing the background color of the touched virtual key.

First of all, a description will be given of an operation of the mobile communication device in the case where the operator uses one finger to input characters with reference to FIG. 8. Referring to FIG. 8, the control unit 22 determines whether or not a virtual key is touched at Step S12.

When it is determined that a virtual key is touched at Step S12 (Yes), the control unit 22 determines whether or not a character to be input, which is a character corresponding to the touched virtual key, or a combination of the character to be input with the determined input character immediately before the character to be input is able to be converted to a Hiragana character at Step S14.

When it is determined that the character to be input or the combination of the character to be input with the preceding determined input character is able to be converted to a Hiragana character at Step S14 (Yes), the control unit 22 converts the character to be input or the combination of the character to be input with the preceding determined input character to the Hiragana character at Step S16.

When it is determined that the character to be input or the combination of the character to be input with the preceding determined input character is not able to be converted to a Hiragana character at Step S14 (No) or Step S16 is executed, the control unit 22 sets the background color of the touched virtual key and the background color of the character to be input or the converted Hiragana character at Step S18. The control unit 22 sets the background color of the character to be input or the Hiragana character to the same color as the background color of the touched virtual key.

Subsequently, the control unit 22 displays the character to be input or the Hiragana character with the background color, which is set at Step S18, in the character entry area 33a at Step S20. Further, the control unit 22 determines whether or not the character to be input has been determined at Step S22.

When it is determined that the character to be input has been determined at Step S22 (Yes), the control unit 22 changes the background color of the determined character at Step S24. As described above, in the case where the character has been input and determined before the conversion to a Hiragana character, the control unit 22 changes the background color of this character to, for example, a light blue. In the case where the character has been input and determined after the conversion to a Hiragana character, the control unit 22 changes the background color of this character to, for example, a blue. In the case where the character has been finally determined, the control unit 22 changes the background color of this character to, for example, a white.

When it is determined that no key is touched at Step S12 (No), it is determined that the character has not been determined at Step S22 (No), or Step S24 is executed, the control unit 22 determines whether or not the character input is terminated at Step S26. When it is determined that the character input is not terminated (No), the processing proceeds to Step S12. When it is determined that the character input is terminated (Yes), the processing terminates.

Then, a description will be given of an operation of the mobile communication device in the case where the operator uses two fingers to input characters with reference to FIG. 9. Referring to FIG. 9, the control unit 22 determines whether or not the first touch on a virtual key is performed at Step S32. That is, the control unit 22 detects for the first touch. The control unit 22 stores a timing at which a touch on each touched position, which is detected, is started, so that a touched order can be detected in the case where two touches are detected on the input unit 28.

When it is determined that the first touch on a virtual key has been performed (Yes), the control unit 22 executes a display processing at Step S34. The details of the display processing are the same as those of Step S14 to Step S20 in FIG. 8 described above.

Subsequently, the control unit 22 determines whether or not the second touch on a virtual key has been performed at Step S36.

When it is determined that the second touch on a virtual key has been performed at Step S36 (Yes), the control unit 22 determines whether or not the character to be input based on the second touch or a combination of the character to be input based on the second touch with the determined input character immediately before the character to be input is able to be converted to a Hiragana character at Step S38.

When it is determined that the character to be input based on the second touch or the combination of the character to be input based on the second touch with the preceding determined input character is able to be converted to a Hiragana character Step S38 (Yes), the control unit 22 converts the character to be input based on the second touch or the combination of the character to be input based on the second touch with the preceding determined input character to a Hiragana character at Step S40.

When it is determined that the character to be input based on the second touch or the combination of the character to be input based on the second touch with the preceding determined input character is not able to be converted to a Hiragana character at Step S38 (No), or Step S40 is executed, the control unit 22 sets the background color of the virtual key, which is touched by the second touch, and the background color of the character to be input based on the second touch or the Hiragana character at Step S42. The control unit 22 sets the background color of the touched virtual key to a color according to its touched order, for example, a color that has the same color phase and is are brighter or darker. Moreover, the control unit 22 sets the background color of the character to be input or the Hiragana character to the same color as the background color of the touched virtual key. In the case where the above-described virtual keyboard (see FIG. 7) in which the background colors are preliminarily set to the respective virtual keys is used, the control unit 22 sets the background color of the character (the Hiragana character after conversion in the case where conversion to Hiragana has been performed at Step S40) corresponding to the touched virtual key to the same color as the background color of the touched virtual key without changing the color of the touched virtual key.

Subsequently, the control unit 22 displays the character to be input based on the second touch or the Hiragana character with the background color, which is set at Step S42, after the character based on the first touch in the character entry area 33a at Step S44. In the case where the combination of the character to be input based on the second touch with the preceding determined input character has been converted to a Hiragana character at Step S40, the Hiragana character is displayed in the character entry area 33a instead of the preceding determined input character.

Subsequently, the control unit 22 determines whether or not the character based on the second touch has been determined at Step S46.

When it is determined that the character based on the second touch has been determined at Step S46 (Yes), the control unit 22 changes the background color of the determined character at Step S48. As described above, in the case where the character has been input and determined before the conversion to a Hiragana character, the control unit 22 changes the background color of this character to, for example, a light blue. In the case where the character has been input and determined after the conversion to a Hiragana character, the control unit 22 changes the background color of this character to, for example, a blue. In the case where the character has been finally determined, the control unit 22 changes the background color of this character to, for example, a white.

When it is determined that the first touch has not been performed at Step S32 (No), it is determined that the second touch has not been performed at Step S36 (No), it is determined that the character has not been determined at Step S46 (No), or Step S48 is executed, the control unit 22 determines whether or not the character input is terminated at Step S50. When it is determined that the character input is not terminated (No), the processing proceeds to Step S32. When it is determined that the character input is terminated (Yes), the processing terminates.

In the above description, the operator uses two fingers to input characters; however, the number of fingers is not limited thereto. For example, in the case where the operator uses three or more fingers to input characters, the mobile communication device 10 is able to be achieved as follows. Similarly to the above description, the control unit 22 executes processings of Step S38 to Step S50 in the flowchart of FIG. 9 for each touch, such as determining availability of the conversion to a Hiragana character, converting to a Hiragana character if it is available, setting the background color of the virtual key and the background color of the character to be input or the Hiragana character, displaying the characters, determining existence of the determined character, and changing the background color the determined character if the character has been determined, in a successive manner.

With the embodiment, in the case where the mobile communication device 10 detects a touch on the virtual key image, the mobile communication device 10 displays the character corresponding to the touched virtual key as the character to be input. In the case where the mobile communication device 10 detects an operation to determine the character to be input, the mobile communication device 10 displays the character to be input as the determined input character. This consequently facilitates touch-typing. The mobile communication device 10 sets the background color of the touched virtual key image and the background color of the character to be input to the same color. This also ensures facilitated touch-typing.

In this embodiment, inputting Japanese Hiragana in the romanization of Japanese is described; however, the method for inputting characters and the language to be input are not limited thereto. The mobile communication device 10 may be employed for inputting various languages such as English, German, French, Chinese, and Korean.

In this embodiment, the virtual keyboard with a QWERTY layout is used; however, the virtual keyboard is not limited thereto. The virtual keyboard may be a virtual keyboard with another layout such as a multi-tap type keypad layout virtual keyboard, or a virtual keyboard for another language such as Hangul language.

In this embodiment, the mobile communication device 10 executes the whole processings; however, the configuration is not limited thereto. The mobile communication device 10 may accomplish the above described processings using a configuration of a so-called cloud computing system, in which a part of processings is executed in an external server coupled through a communication line, that is, a part of functions of the control unit 22 is achieved in the external server. In this case, the mobile communication apparatus 10 detects an input at the mobile communication device 10, processes the detected information so as to transmit the external server, and processes information received from the external server so as to display an image. That is, the mobile communication apparatus 10 executes the processing to transmit and receive needed information in the control unit 22 while communicating with the external server through the communication unit 26 for a part of the some processings, thus achieving functions similar to the above processings.

INDUSTRIAL APPLICABILITY

As described above, the character input device and the character input method according to the present invention are effective for the character input.

The invention claimed is:
1. A character input device comprising:
a display unit for displaying a screen having a character entry area and a virtual keyboard, the virtual keyboard including a plurality of keys each of which corresponds to a character;
an input detecting unit for detecting a touch by an operator; and
a control unit configured to
detect a key selection operation and an input determination operation through the input detecting unit,
display, upon detecting the key selection operation for a first key, a first character corresponding to the first key in the character entry area as a character to be input, and
display, upon detecting the input determination operation, the first character in the character entry area as an input character, wherein
the control unit is configured to delete, when the touch for the key selection operation is released before detecting the input determination operation, the first character in the character entry area.
2. The character input device according to claim 1, wherein the control unit is configured to set a color of the first key and a background color of the first character as the character to be input to a same color.
3. The character input device according to claim 1, wherein the control unit is configured to change a background color of the first character to another color upon displaying the first character as the input character.

4. The character input device according to claim 1, wherein the control unit is configured to set, upon detecting that the key selection operations are performed for a plurality of keys, respective colors of the plurality of keys and respective background colors of a plurality of characters to be input corresponding thereto to different colors according to an order where the key selection operations are performed.

5. The character input device according to claim 4, wherein the control unit is configured to set the background colors of the plurality of keys being touched and the background colors of the plurality of characters to be input corresponding thereto to colors that have a same color phase and are gradually brighter or darker according to the touched order.

6. The character input device according to claim 1, wherein the control unit is configured to convert,
when the character to be input is an alphabet and the character to be input is allowed to be converted to a Kana character according to a pre-input alphabet that is input immediately before the character is input,
the character to be input or
a combination of the character to be input with the pre-input alphabet to the Kana character to display at position thereof.

7. The character input device according to claim 6, wherein the control unit is configured to set the background color of the replaced Kana character to a same color as the background color of the character to be input before replacing.

8. The character input device according to claim 6, wherein,
when the character to be input and the pre-input alphabet are each Roman characters,
the control unit is configured to convert the character to be input and the pre-input alphabet to the Kana characters.

9. The character input device according to claim 1, wherein the control unit is configured to display the virtual keyboard, in which colors of the respective keys are preliminarily set, on the display unit.

10. The character input device according to claim 9, wherein the control unit is configured to
display, upon detecting the key selection operation for the first key, the first character corresponding to the first key in the character entry area as the character to be input with a same background color as that of the first key.

11. The character input device according to claim 9, wherein the control unit is configured to display the virtual keyboard on the display unit, the virtual keyboard including the keys at one side of a horizontal center having a first color phase and the keys at another side of the horizontal center having a second color phase, the keys gradually changing in brightness that are brighter or darker toward both ends from the horizontal center.

12. The character input device according to claim 1, wherein the input detecting unit is configured to detect a touch in at least two stages including a touch with pressure equal to or less than a predetermined threshold value and a touch with pressure higher than the threshold value, and
the control unit is configured to detect the input determination operation when the touch with pressure higher than the threshold value is detected by the input detecting unit.

13. The character input device according to claim 1, wherein the control unit is configured to detect the input determination operation when it is detected that the touch is released through the input detecting unit.

14. The character input device according to claim 1, wherein the control unit is configured to display, upon detecting the key selection operation for a second key while the first character is displayed in the character entry area as the character to be input, the first character and a second character corresponding to the second key in the character entry area as characters to be input.

15. The character input device according to claim 14, wherein the control unit is configured to
set a color of the first key and a background color of the first character as the character to be input to a first color, and
set a color of the second key and a background color of the second character as the character to be input to a second color.

16. The character input device according to claim 15, wherein the second color has a same color phase as that of the first color and is brighter or darker than the first color.

17. The character input device according to claim 1, wherein the control unit is configured to
display, upon detecting the key selection operation for a second key while detecting the key selection operation for the first key, the first character and a second character corresponding to the second key in the character entry area as characters to be input, and
display, upon detecting the key selection operation for the second key after detecting a completion of the key selection operation for the first key, the second character in the character entry area as a character to be input instead of the first character.

18. The character input device according to claim 1, wherein the key selection operation is a touch with pressure that is higher than zero and equal to or less than a threshold value, and
the input determination operation is a touch with pressure that is higher than the threshold value or a touch being released.

19. The character input device according to claim 18, wherein the character to be input is a character corresponding to a key for which the key selection operation is detected, and
the input character is a character corresponding to a key for which the input determination operation is detected.

20. A character input method for a character input device that includes a display unit and an input detecting unit, the method comprising:
displaying a screen having a character entry area and a virtual keyboard on the display unit;
arranging a plurality of keys each of which corresponds to a character on the virtual keyboard;
detecting a key selection operation through the input detecting unit;

detecting an input determination operation through the input detecting unit;

displaying, upon detecting the key selection operation for a first key, a first character corresponding to the first key in the character entry area as a character to be input; and displaying, upon detecting the input determination operation, the first character in the character entry area as an input character, wherein the method further comprises:

deleting, when a touch for the key selection operation is released before detecting the input determination operation, the first character in the character entry area.

\* \* \* \* \*